(12) United States Patent
Anders et al.

(10) Patent No.: US 11,598,300 B2
(45) Date of Patent: Mar. 7, 2023

(54) FUEL SYSTEM FOR REDUCING FUEL TARGETING ERRORS AND ENGINE OPERATING METHOD

(71) Applicant: Caterpillar Inc., Peoria, IL (US)

(72) Inventors: Jonathan W. Anders, Peoria, IL (US); Bobby John, Peoria, IL (US); Robert Campion, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 10 days.

(21) Appl. No.: 17/176,268

(22) Filed: Feb. 16, 2021

(65) Prior Publication Data

US 2021/0164428 A1 Jun. 3, 2021

Related U.S. Application Data

(62) Division of application No. 16/106,665, filed on Aug. 21, 2018, now Pat. No. 10,989,153.

(51) Int. Cl.
| | |
|---|---|
| *F02M 45/00* | (2006.01) |
| *F02M 45/08* | (2006.01) |
| *F02B 23/06* | (2006.01) |
| *F02M 47/02* | (2006.01) |

(52) U.S. Cl.
CPC ....... *F02M 45/086* (2013.01); *F02B 23/0627* (2013.01); *F02B 23/0651* (2013.01); *F02B 23/0666* (2013.01); *F02M 47/027* (2013.01); *F02M 2200/46* (2013.01)

(58) Field of Classification Search
CPC ............. F02M 45/086; F02M 47/027; F02M 2200/46; F02M 2200/44; F02M 2200/28; F02M 61/1813; F02M 63/0064; F02B 23/0627; F02B 23/0651; F02B 23/0666; F02B 23/0696; F02B 23/0669; F02D 19/105; F02D 2200/101; F02D 2200/0406; F02D 41/0027; F02D 41/3836
See application file for complete search history.

(56) References Cited

U.S. PATENT DOCUMENTS

| | | | | |
|---|---|---|---|---|
| 5,737,912 | A * | 4/1998 | Krakowitzer | F01K 23/103 60/774 |
| 7,243,862 | B2 * | 7/2007 | Dingle | F02M 61/06 239/408 |
| 7,556,017 | B2 * | 7/2009 | Gibson | F02M 45/086 123/305 |
| 8,596,561 | B2 * | 12/2013 | Kim | F02D 19/0694 239/584 |

(Continued)

*Primary Examiner* — Phutthiwat Wongwian
*Assistant Examiner* — Sherman D Manley
(74) *Attorney, Agent, or Firm* — Brannon Sowers & Cracraft PC (57) ABSTRACT

Operating an engine includes injecting a first charge of liquid fuel using a first set of nozzle outlets in a fuel injector, and injecting a second charge of liquid fuel using a second set of nozzle outlets in a fuel injector. The first charge is autoignited in a first engine cycle, and the second charge is autoignited in a second engine cycle, and may be used to pilot ignite a charge of gaseous fuel. Operating the engine further includes limiting errors in targeting of the second charge of liquid fuel caused by transitioning the engine from a first combination to a second combination of speed, load, and boost, by varying an injection pressure of the liquid fuel from the first engine cycle to the second engine cycle.

18 Claims, 5 Drawing Sheets

(56) References Cited

U.S. PATENT DOCUMENTS

| | | | |
|---|---|---|---|
| 8,967,502 B2* | 3/2015 | Kim ................... | F02M 47/027 |
| | | | 239/585.4 |
| 9,506,434 B2* | 11/2016 | Coldren .............. | F02M 61/045 |
| 10,767,610 B2* | 9/2020 | Anders .............. | F02M 61/1826 |
| 2007/0246561 A1* | 10/2007 | Gibson ................ | F02M 47/027 |
| | | | 239/443 |
| 2009/0139487 A1* | 6/2009 | Dingle ................ | F02M 61/182 |
| | | | 239/548 |
| 2010/0269783 A1* | 10/2010 | Hergart .............. | F02M 61/1846 |
| | | | 123/472 |
| 2012/0325180 A1* | 12/2012 | Montgomery ...... | F02D 19/0694 |
| | | | 123/299 |
| 2015/0247468 A1* | 9/2015 | Chittenden .......... | F02M 43/04 |
| | | | 123/490 |
| 2017/0107958 A1* | 4/2017 | Kalenborn ............ | F02M 43/04 |
| 2018/0003131 A1* | 1/2018 | Berger ................ | F02M 21/0275 |
| 2020/0063704 A1* | 2/2020 | Anders .............. | F02D 41/3011 |

* cited by examiner

FUEL SYSTEM FOR REDUCING FUEL TARGETING ERRORS AND ENGINE OPERATING METHOD

TECHNICAL FIELD

The present disclosure relates generally to dual outlet check fuel injection systems and related operating strategies, and more particularly to apparatus and methodology for targeting of liquid fuel charges in an engine cylinder.

BACKGROUND

Modern internal combustion engines designed to run on more than one type of fuel are of increasing commercial interest. In the compression ignition engine context, so-called dual fuel engines may include a supply of liquid fuel, such as a diesel distillate fuel, as well as a cryogenically or otherwise stored gaseous fuel. Gaseous fuels can offer advantages such as reduced emissions of certain types and in many instances lower cost. Diesel fuel tends to be associated with greater performance in at least certain applications. Designs are known where an operator or an engine control unit can switch between a diesel-only mode and a gaseous fuel-only mode or a blended mode.

In some instances, it can be advantageous to use a relatively small or pilot amount of diesel fuel to ignite a larger, main charge of gaseous fuel. It is typical for such dual fuel engines to employ a liquid fuel injector positioned directly within the combustion cylinder, which is operated to inject a pilot amount of diesel fuel when the engine is to be operated predominantly on gaseous fuel, and to inject a larger, main injection of liquid fuel when the engine is to be operated in diesel-only mode. While such systems have shown promise, there can be controllability or other issues associated with attempting to operate the fuel injector to inject relatively tiny pilot injections some of the time, and far larger main injections at other times. U.S. Pat. No. 9,638,118 to Schaller et al. is directed to a System and Method For Supplying Natural Gas To A Dual Fuel Engine, and illustrates one known design.

SUMMARY OF THE INVENTION

In one aspect, a method of operating an engine includes injecting a first charge of liquid fuel into a cylinder in the engine using a first set of nozzle outlets in a fuel injector, such that spray jets of the first charge of liquid fuel have orientations that are based at least in part on a first spray angle of the first set of nozzle outlets. The method further includes autoigniting the first charge of liquid fuel in a first engine cycle. The method further includes injecting a second charge of liquid fuel into the cylinder using a second set of nozzle outlets in the fuel injector, such that spray jets of the second charge of liquid fuel have orientations that are based on a second spray angle of the second set of nozzle outlets that is different from the first spray angle. The method still further includes autoigniting the second charge of liquid fuel in a second engine cycle, and transitioning the engine from a first speed, load, and boost combination in the first engine cycle to a second speed, load, and boost combination in the second engine cycle. The method still further includes limiting errors in targeting of the second charge of liquid fuel that are caused by the transitioning of the engine at least in part by varying an injection pressure of the liquid fuel from the first engine cycle to the second engine cycle.

In another aspect, a method of operating an engine includes injecting a main charge of liquid fuel into a cylinder in the engine using a first set of nozzle outlets in a fuel injector, and autoigniting the main charge of liquid fuel in a first engine cycle. The method further includes delivering a main charge of gaseous fuel into the cylinder in a second engine cycle, and injecting a pilot charge of liquid fuel into the cylinder using a second set of nozzle outlets in the fuel injector. The method further includes autoigniting the pilot charge of liquid fuel in the second engine cycle such that the main charge of gaseous fuel is pilot ignited, and transitioning the engine from a first speed, load, and boost combination in the first engine cycle to a second speed, load, and boost combination in the second engine cycle. The method still further includes varying an injection pressure of the liquid fuel based on the transitioning of the engine, such that the main charge of liquid fuel is targeted within the cylinder based on a first injection pressure in the first engine cycle, and the pilot charge of liquid fuel is targeted within the cylinder based on a second injection pressure in the second engine cycle.

In still another aspect, a fuel system for an engine includes a pressurized fuel reservoir, and a fuel pressure control device structured to vary a fuel pressure in the pressurized fuel reservoir. The fuel system further includes a liquid fuel injector defining a first set of nozzle outlets, and a second set of nozzle outlets, and including a first outlet check movable to open or close the first set of nozzle outlets to the pressurized fuel reservoir, and a second outlet check movable to open or close the second set of nozzle outlets to the pressurized fuel reservoir. The liquid fuel injector further includes a first injection control valve and a second injection control valve coupled with the first outlet check and the second outlet check, respectively. The fuel system still further includes a control system including an electronic control unit coupled with each of the first injection control valve and the second injection control valve and with the fuel pressure control device. The electronic control unit is structured to command actuation of the first injection control valve to inject a first charge of liquid fuel into a cylinder in the engine using the first set of nozzle outlets, and to command actuation of the second injection control valve to inject a second charge of liquid fuel into the cylinder in the engine using the second set of nozzle outlets. The electronic control unit is further structured to receive data indicative of transitioning of the engine between a first combination of speed, load, and boost in a first engine cycle, and a second combination of speed, load, and boost in a second engine cycle. The electronic control unit is still further structured to vary an injection pressure of the liquid fuel based on the data indicative of transitioning of the engine, such that the first charge of liquid fuel is targeted within the cylinder based on a first injection pressure in the first engine cycle and the second charge of liquid fuel is targeted within the cylinder based on a second injection pressure in the second engine cycle.

DETAILED DESCRIPTION

Figure 1:
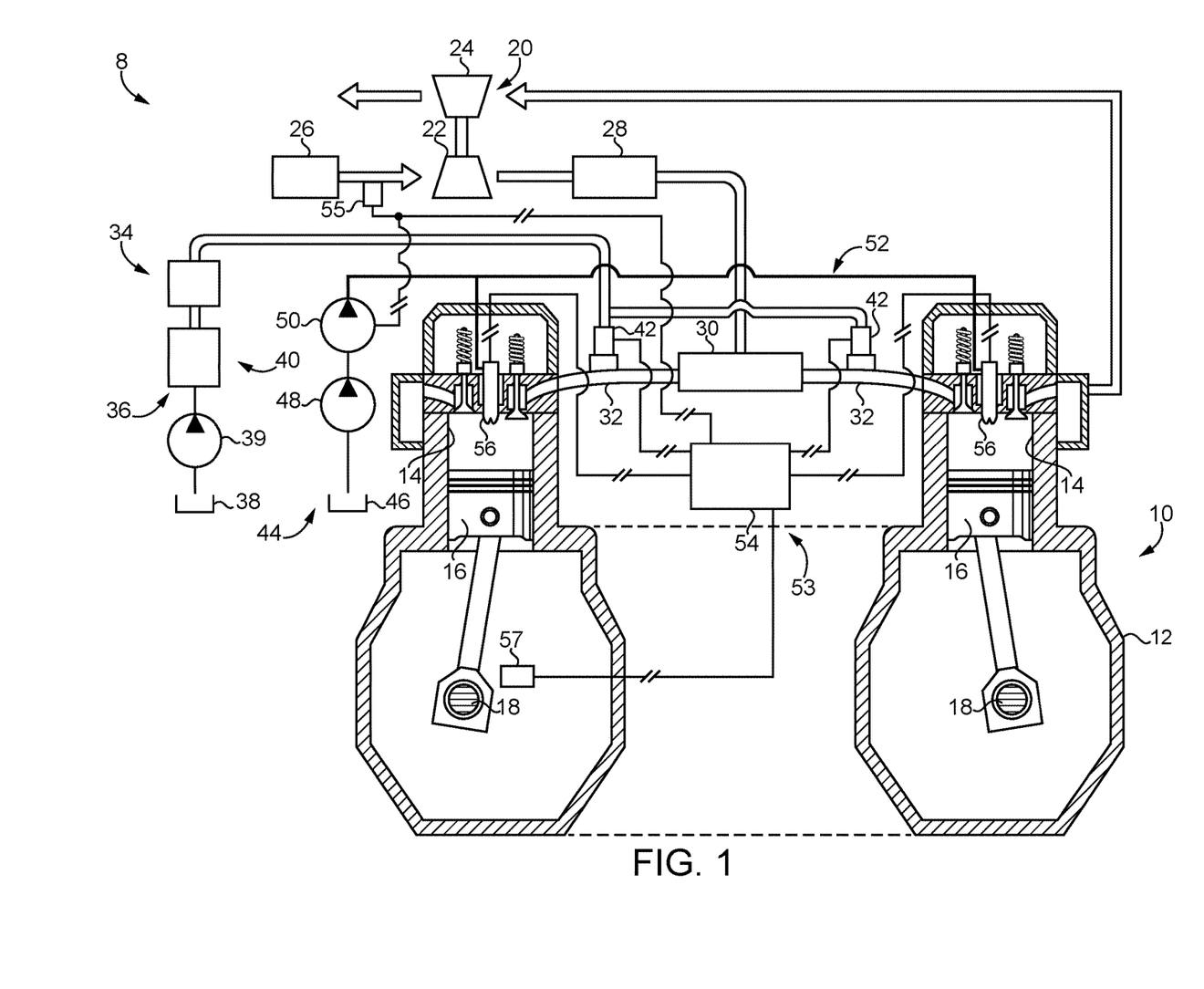
FIG. 1 is a partially sectioned side diagrammatic view of an internal combustion engine system, according to one embodiment.

Referring to FIG. 1, there is shown an internal combustion engine system 8 (hereinafter "engine system 8"), according to one embodiment. Engine system 8 can include a dual fuel engine system 8 structured to operate on two different fuels, typically a liquid fuel and a gaseous fuel. In an implementation, the liquid fuel can include diesel distillate fuel and the gaseous fuel can include natural gas, methane, or other hydrocarbon fuels or blends that are gaseous at standard temperature and pressure. Engine system 8 includes an internal combustion engine 10 having a housing 12 with a plurality of combustion cylinders 14 formed therein. Cylinders 14 can be of any number and in any suitable arrangement such as an in-line arrangement, a V-configuration, or still another arrangement. A piston 16 is movable within each one of combustion cylinders 14 to rotate a crankshaft 18 in a generally conventional manner. Engine system 8 can further include an intake conduit 26 structured to feed air for combustion to combustion cylinders 14 by way of a turbocharger 20 including a compressor 22 and a turbine 24. An aftercooler 28 is positioned downstream of compressor 22 and conveys cooled and compressed air to an intake manifold 30. A plurality of intake runners 32 extend between intake manifold 30 and each of combustion cylinders 14, again in a generally conventional manner.

Engine system 8 further includes a fuel system 34 including a gaseous fuel subsystem 36 and a liquid fuel subsystem 44. Gaseous fuel subsystem 36 includes a fuel supply 38 which can provide a gaseous fuel, in a cryogenically stored liquid state, to vaporization and pressurization equipment 40 by way of a pump 39. Equipment 40 can include a vaporizer, structured to transition the gaseous fuel from a liquid state to a gaseous state, a pressurization pump 39 structured to pressurize the gaseous fuel for delivery to engine 10, and various other known monitoring and regulating components. In the illustrated embodiment, a gaseous fuel admission valve 42 is coupled with each intake runner 32. In other embodiments one or more gaseous fuel admission valves 42 could convey gaseous fuel into intake manifold 30, or elsewhere upstream of intake manifold 30 such as upstream of compressor 22. In still other embodiments a gaseous fuel admission valve 42 in the nature of a gaseous fuel injector could be positioned to inject gaseous fuel directly into each one of combustion cylinders 14.

Liquid fuel subsystem 44 includes a liquid fuel supply 46 such as a fuel tank, and can include at least one pump 39 structured to convey the liquid fuel to engine 10. In the illustrated embodiment a low-pressure transfer pump 48 receives fuel from supply 46 and transitions the fuel to a high-pressure pump 50 that feeds a pressurized fuel reservoir 52 such as a common rail. It should be appreciated that a single monolithic pressurized fuel reservoir could be used, as well as a plurality of separate pressure accumulators, or still another strategy such as a plurality of unit pumps. An electronic control unit 54 may be coupled with each gaseous fuel admission valve 42, as well as a plurality of liquid fuel injectors 56 of liquid fuel subsystem 44. Liquid fuel injectors 56 may each be coupled with engine housing 12 and positioned so as to extend at least partially into each one of combustion cylinders 14. Each liquid fuel injector 56 can include twin outlet checks, as further discussed herein, structured to inject liquid fuel in different quantities, at different spray angles, for example, and for different purposes, including production of a pilot charge of liquid fuel for igniting a main charge of gaseous fuel, as well as injection of a main charge of liquid fuel. Those skilled in the art will appreciate the potential application of the twin outlet check liquid fuel injectors 56 to so-called diesel-only mode operation, mixed-mode or blended-mode operation, and still other operating strategies. As will be further apparent from the following description, it is contemplated that separate control and separate design of the twin outlet checks enables optimization for their different intended purposes.

Figure 2:
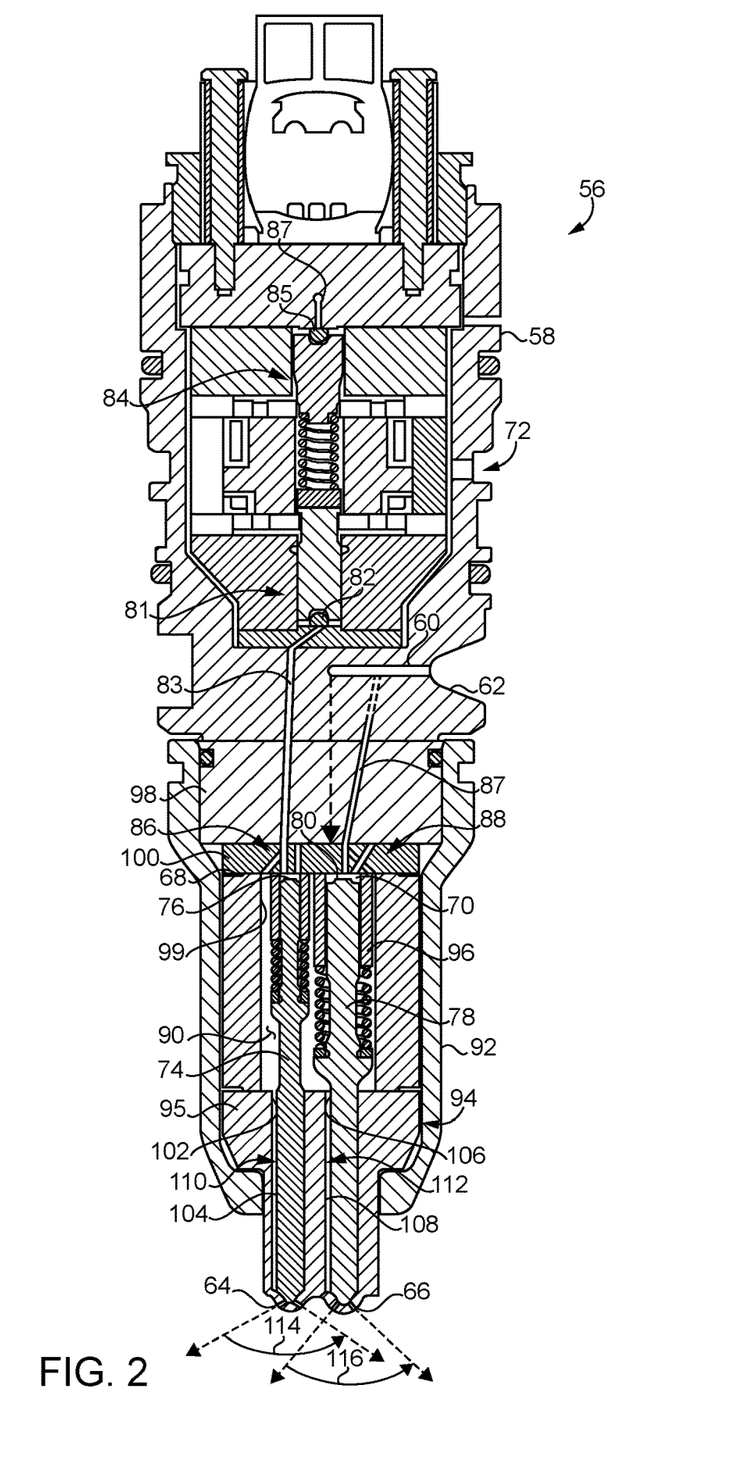
FIG. 2 is a sectioned side view of a fuel injector suitable for use in the internal combustion engine system of FIG. 1.

Referring also now to FIG. 2, there is shown a sectioned view through a liquid fuel injector 56 of a type suitable for use in engine system 8. Fuel injector 56 includes an injector body 58 defining a high-pressure inlet passage 60 connected with a high-pressure inlet 62. Inlet 62 may fluidly connect with reservoir/common rail 52, for example, by way of a so called quill connector in one embodiment. Injector body 58 further defines a set of nozzle outlets 64, a set of nozzle outlets 66, a control chamber 68, and a control chamber 70 each fluidly connected to high-pressure inlet passage 60. Injector body 58 also defines a low-pressure space 72 that can be a low-pressure outlet or drain, or multiple low-pressure outlets or drains, within injector body 58 or the space outside injector body 58. Fuel injector 56 further includes a first outlet check 74 having a closing hydraulic surface 76 exposed to a fluid pressure of control chamber 68 and movable between a closed position blocking nozzle outlets 64, and an open position. Fuel injector 56 also includes a second outlet check 78 having a closing hydraulic surface 80 exposed to a fluid pressure of control chamber 70 and movable between a closed position blocking nozzle outlets 66, and an open position. Lifting outlet check 74 or outlet check 78 can fluidly connect the corresponding nozzle outlet set 64,66 to fluid reservoir/common rail 52. In the illustrated embodiment first outlet check 74 and second outlet check 78 are arranged side-by-side, and of nozzle outlets 64 have at least one of a spray angle, an outlet size, or an outlet number that is different from a spray angle, an outlet size or an outlet number of nozzle outlets 66. Nozzle outlets 64 may define a spray angle 114, and nozzle outlets 66 may define a spray angle 116. In an implementation, spray angle 114 may be larger than spray angle 116. Spray angle 114 might be about 140°, and spray angle 116 might be about 125°. Each of spray angle 114 and spray angle 116 might be in a range from about 125° to about 145°. Example spray angles and their significance in the present context are further discussed below.

Fuel injector 56 further includes a first electrically actuated injection control valve 82 in a first control valve assembly 81. Injection control valve 82 can be a first two-way injection control valve, and is positioned fluidly between control chamber 68 and low-pressure space 72. A control passage 83 extends between control valve assembly 81 and control chamber 68. Control valve 82 is movable between a closed position blocking fluid communication between control passage 83 and low-pressure space 72 and an open position at which control passage 83 is fluidly connected to low-pressure space 72. Control valve 82 is thus structured to connect or disconnect a total of two passages. Fuel injector 56 also includes a second electrically actuated injection control valve 85 in a control valve assembly 84. Injection control valve 85 can be a second two-way injection control valve, and is positioned fluidly between control chamber 70 and low-pressure space 72. A control passage 87 extends between control chamber 70 and control valve assembly 84. Control valve assembly 84 can function analogously to control valve assembly 81. In the illustrated embodiment each of control valve assembly 81 and control valve assembly 84 is a solenoid actuated control valve assembly structured to vary between a deenergized state where the respective control valves 82 and 85 are at their closed positions, and an energized state where control valves 82 and 85 move in opposition to a spring biasing force to an open position. Certain components are shared among control valve assembly 81 and control valve assembly 84, however, the present disclosure is not thereby limited. It can also be seen from FIG. 2 that control passage 83 and control passage 87 extend through a number of components of injector body 58, and may be out of plane in the view illustrated. Each of injection control valve 82 and injection control valve 85 can include a ball valve or a half-round, hemispheric valve structured to move into and out of contact with a valve seat that may be flat, however, the present disclosure is not thereby limited. Those skilled in the art will be familiar with the design technique of providing for flow to low-pressure space 72 between or among the various components in injector body 58 between injection control valve assemblies 81 and 84 and low-pressure space 72 when injection control valves 82 and 85 are opened.

Injector body 58 further includes a casing 92 and a stack 94 positioned within casing 92. Injector body 58 also defines a common nozzle supply cavity 90 in fluid communication with high-pressure inlet passage 60. Common nozzle supply cavity 90 can be understood as part of high pressure inlet passage 60, which in turn can be understood to extend from high pressure inlet 62 to each of nozzle outlets 64 and nozzle outlets 66 and is itself part of fluid reservoir/common rail 52. Nozzle outlets 64 and nozzle outlets 66 are fluidly connected to common nozzle supply cavity 90 at the open position of first outlet check 74 and second outlet check 78, respectively. Common nozzle supply cavity 90 may be formed within stack 94, and each of first outlet check 74 and second outlet check 78 extends through common nozzle supply cavity 90. Stack 94 also includes a tip piece 95, positioned within casing 92 and having nozzle outlets 64 and nozzle outlets 66 formed therein. A spacer 96, which can be cylindrical in shape, is positioned to abut tip piece 95 and includes a wall 99 extending circumferentially around first outlet check 74 and second outlet check 78 so as to form common nozzle supply cavity 90. Yet another stack piece 98 is positioned at least partially within casing 92, and an orifice plate 100 is sandwiched between stack piece 98 and spacer 96. Each of first outlet check 74 and second outlet check 78 can include opening hydraulic surfaces (not numbered) exposed to a fluid pressure of common nozzle supply cavity 90. Each of first outlet check 74 and second outlet check 78 is further biased closed by way of spring biasing in a generally known manner. It can also be noted that each of first outlet check 74 and second outlet check 78 extends through tip piece 95. Tip piece 95 has therein a first guide bore 102 that receives first outlet check 74 and forms a first nozzle supply passage 104 with first outlet check 74. Tip piece 95 also has therein a second guide bore 106 that receives second outlet check 78 and forms a second nozzle supply passage 108 with second outlet check 78. A first M-orifice 110 is formed within tip piece 95 to limit flow through first nozzle supply passage 104. A second M-orifice 112 is formed within tip piece 95 to limit flow through second nozzle supply passage 108.

Figure 3:
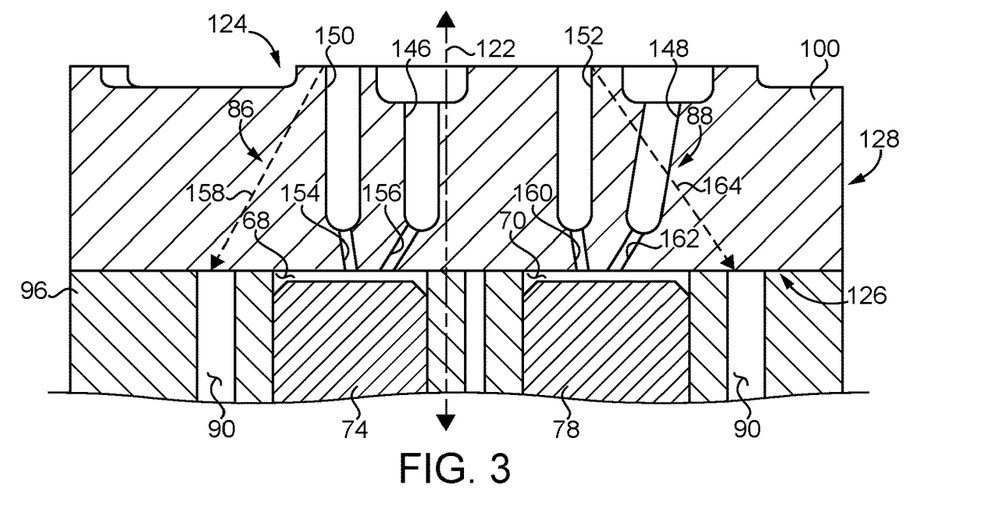
FIG. 3 is a sectioned view through an orifice plate taken along line 3-3 of FIG. 4, according to one embodiment.
Figure 4:
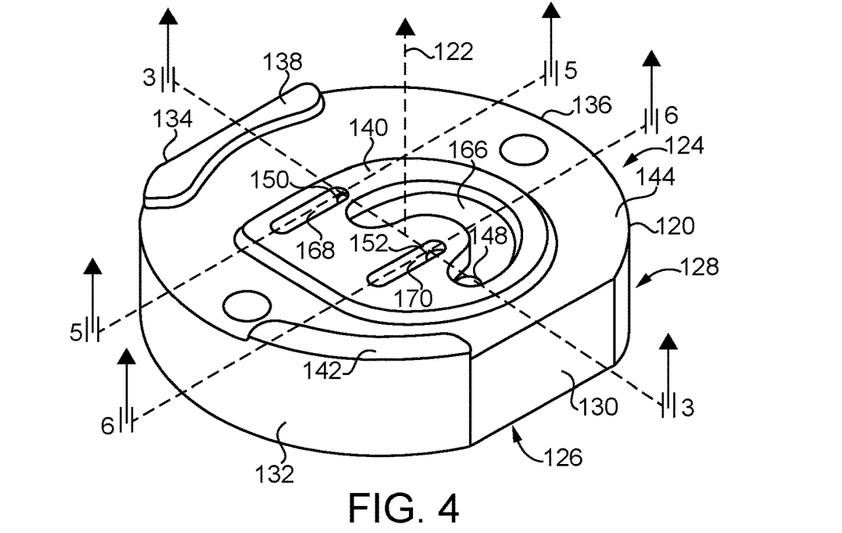
FIG. 4 is a perspective view of an orifice plate, according to one embodiment.

Injector body 58 still further defines a first set of orifices 86 arranged in an A-F-Z pattern among high-pressure inlet passage 60, low-pressure space 72, and first control chamber 68. An "A" orifice is positioned fluidly between a check control chamber and an outlet to low pressure, whereas a "Z" orifice is fluidly between incoming high pressure and a check control chamber, and an "F" orifice fluidly connects a high pressure supply for the Z-orifice to an outlet of the A-orifice. A second set of orifices 88 is arranged in an A-F-Z pattern among high-pressure inlet passage 60, low-pressure space 72, and second control chamber 70. Referring also now to FIGS. 3 and 4, there are shown additional details of orifice plate 100. Orifice plate 100 includes a one-piece orifice plate body 120 defining a center axis 122 extending between an upper plate body side 124 and a lower plate body side 126. Orifice plate body 120 also includes an outer peripheral edge 128 extending circumferentially around center axis 122. In the illustrated embodiment, outer peripheral edge 128 includes a first linear segment 130, a first arcuate segment 132, a second linear segment 134, and a second arcuate segment 136. First and second arcuate segments 132 and 136 are in an alternating arrangement with first and second linear segments 130 and 134. Orifice plate body 120 also has a plurality of raised sealing surfaces 138,140, and 142 including a first raised sealing surface 138, a second raised sealing surface 140, and a third raised sealing surface 142. It can be seen from FIG. 4 that sealing surface 138 and sealing surface 142 are arranged adjacent to first arcuate segment 132 and second linear segment 134, respectively. Orifice plate body 120 also includes a recessed surface 144 positioned axially inward of raised sealing surfaces 138, 140, and 142. Orifice plate body 120 further has a first inlet passage 146 and a second inlet passage 148 extending between upper plate body side 124 and lower plate body side 126, for feeding high-pressure fuel to first control chamber 68 for first outlet check 74 and second control chamber 70 for second outlet check 78, respectively.

Orifice plate body 120 also includes a first outlet passage 150 and a second outlet passage 152 extending between lower plate body side 126 and upper plate body side 124, for connecting first and second control chambers 68 and 70 to low-pressure space 72. First set of orifices 86 in orifice plate body 120 is also shown in FIG. 3 and include a first A-orifice 154 formed in first outlet passage 150, a first Z-orifice 156 formed in first inlet passage 146, and a first F-orifice 158. F-orifice 158 is out of plane in FIG. 3, but described and illustrated elsewhere hereinafter. Second set of orifices 88 in orifice plate body 120 is also shown in FIG. 3 and includes a second A-orifice 160 formed in second outlet passage 152, a second Z-orifice 162 formed in second inlet passage 148, and a second F-orifice 164. First and second F-orifices 158 and 164 fluidly connect first and second outlet passages 150 and 152 to lower plate body side 126 to fluidly connect common nozzle supply cavity 90 in fuel injector 56 to each of first and second control chambers 68 and 70. Provision of F-orifices 158 and 164 assists in refilling of control chambers 68 and 70 at the end of fuel injection, as further discussed herein. It should be appreciated that F-orifices 158 and 164 could connect to high-pressure inlet passage 60 by another architecture. In other words, in a practical implementation strategy F-orifices 158 and 164 connect to common nozzle supply cavity 90, but could be configured otherwise without departing from the scope of the present disclosure. The various orifices described herein could also be positioned in components of stack 94 other than orifice plate 100 in other embodiments.

It can also be noted from FIG. 4 that a first connector channel 166 is formed in upper plate body side 124 and fluidly connects first inlet passage 146 to second inlet passage 148. First connector channel 166 may have a C-shaped configuration, although the present disclosure is not thereby limited. A second connector channel 168 is formed in upper plate body side 124 and fluidly connects first outlet passage 150 to first F-orifice 158. A third connector channel 170 is formed in upper plate body side 124 and fluidly connects first outlet passage 150 to second F-orifice 164. Each of second connector channel 168 and third connector channel 170 may be linear in shape. It can also be noted that each of first, second, and third connector channels 166, 168, and 170 is formed in raised sealing surface 140. The axial depth between raised sealing surfaces 138, 140, and 142 and recessed surface 144 can provide a space that is connected to high pressure when fuel injector 56 is assembled for service. First and second inlet passages 146 and 148 and first and second outlet passages 150 and 152 may be in an alternating arrangement between first and second linear segments 130 and 134 of outer peripheral edge 128.

Figure 5:
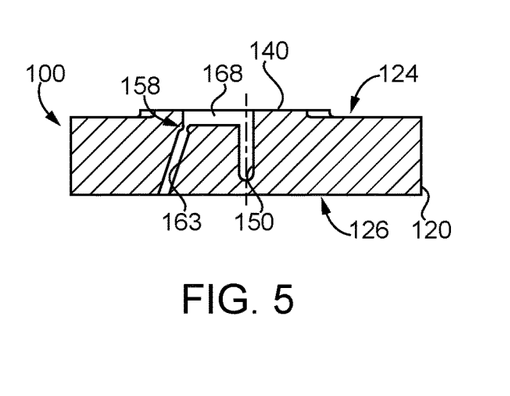
FIG. 5 is a sectioned view taken along line 5-5 of FIG. 4.
Figure 6:
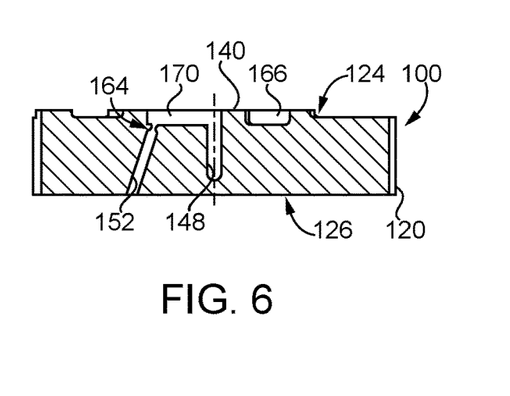
FIG. 6 is a sectioned view taken along line 6-6 of FIG. 4.

Referring also now to FIG. 5 and FIG. 6, there are shown sectioned views taken along lines 5-5 and 6-6 of FIG. 4. It will also be noted that the sectioned view in FIG. 3 includes subject matter of orifice plate 100 taken along line 3-3 of FIG. 4. It can be seen from FIG. 5 and FIG. 6 that F-orifices 158 and 164 each extend at an angle from the corresponding connector channel 168 and 170, relative to center axis 122. It will be recalled that F-orifices 158 and 164 provide fluid connections between outlet passages 150 and 152 and common nozzle supply cavity 90. A first fluid passage 163 extends between upper plate body side 124 and lower plate body side 126, and a second fluid passage 152 also extends between upper plate body side 124 and lower plate body side 126. First fluid passage 163 includes first F-orifice 158 and opens at lower plate body side 126, whereas second fluid passage 152 includes second F-orifice 160 and opens at lower plate body side 126. It can also be noted from FIGS. 35 that each of first and second A-orifices 154 and 160 and each of first and second Z-orifices 156 and 162 is formed adjacent to lower plate body side 126. Each of first and second F-orifices 156 and 158 can be formed adjacent to upper plate body side 124. Sizes of each of the A, F, and Z-orifices herein may be within an order of magnitude of one another.

Returning to FIG. 1, it will be recalled that common rail 52 is but one of several different kinds of pressurized fuel reservoirs that might be employed within the context of the present disclosure. A pressurized fuel reservoir could include, for example, an accumulator fluidly connected with one or more individual liquid fuel injectors. Rather than an external pressurized fuel reservoir, in some instances a cavity or volume within an injector body could be considered a pressurized fuel reservoir. It will also be understood that varying operation of pump 50 can vary fuel pressure within common rail 52. For example, pump 50 could be an inlet metered pump or an outlet metered pump having a metering element adjusted to vary a pressure of fuel in a fluidly connected pressurized fuel reservoir such as common rail 52 in a generally known manner.

Engine system 8 can also include a control system 53 that includes an electronic control unit 54. Electronic control unit 54 can include any suitable computerized control device such as a microprocessor or a microcontroller and is coupled with each of first injection control valve 82 and second injection control valve 85. Electronic control unit 54 can also be coupled with pump 50 such that pump 50 can serve as a fuel pressure control device, with electronic control unit 54 controlling the operation of pump 50 to vary pressure in common rail 52. Additionally or alternatively a fuel pressure control device within the present context could include an electrically actuated pressure relief valve (not shown) coupled with common rail 52 or another pressurized fuel reservoir. In one implementation, electronic control unit 54 is structured to command actuation of injection control valve 82 or injection control valve 85 to inject a first charge of liquid fuel into the corresponding cylinder 14 using nozzle outlets 66 or nozzle outlets 64. Electronic control unit 54 may further be structured to command actuation of injection control valve 82 or 85 to inject a second charge of liquid fuel into the corresponding cylinder 14 in engine 10 using the corresponding set of nozzle outlets 64 or 66. It should be appreciated that the terms "first" and "second" are used herein for descriptive convenience, and are not intended to limit or define which of the respective nozzle outlet sets 64 and 66 is used before the other, after the other, or in any other limiting manner. Thus, depending upon context or perspective, either of nozzle outlets 64 or 66 could be considered a "first" or a "second" set of nozzle outlets and either could inject the "first" or "second" charge of liquid fuel. Control system 53 also includes a speed sensor 57, such as a rotation sensor, which can be coupled with crankshaft 18, or any other rotating or reciprocating component in engine system 8 having a known or determinable state that varies in a known or determinable way with engine speed. For instance, sensor 57 could be coupled with a part of a geartrain (not shown) of engine 10, or potentially with transmission gears in a transmission coupled with engine 10, with a camshaft, a reciprocating valve lifter, et cetera. Control system 53 also may include a charge air mass flow sensor 55 within parts of engine system 8 through which air is supplied for combustion within cylinders 14. Those skilled in the art will appreciate that various mechanisms and strategies can be used for determining or estimating a load on engine 10. Charge air mass flow sensor 55 can be used for this purpose, potentially also in connection with temperature sensors and other known equipment used in determining, estimating, or inferring a load on engine 10.

Based on outputs or states of one or more sensors of engine system 8, electronic control unit 54 may be structured to receive data indicative of transitioning of engine 10 between a first combination of speed, load, and boost in a first engine cycle, and a second combination of speed, load, and boost in a second engine cycle. The first engine cycle might be an engine cycle immediately preceding the second engine cycle, or one or more intervening engine cycles might occur between the first engine cycle and the second engine cycle. For that matter, the first engine cycle could occur later in time than the second engine cycle consistent with other uses herein of the terms "first" and "second." It should further be understood that a first combination of speed, load, and boost differs from a second combination of speed, load, and boost where any one of engine speed, engine load, or turbocharger boost pressure differs among the respective combinations. In some instances, from one engine cycle to another engine cycle only one of speed, load, and boost might differ, whereas in other instances two of speed, load, and boost might differ, and in still other instances each of speed, load, and boost can differ. Those skilled in the art will also appreciate that an internal combustion engine such as engine 10 can operate fairly dynamically, with engine speed, engine load, and boost pressure increasing, decreasing, or remaining relatively constant over time depending upon how and the purposes for which engine 10 is being operated. According to the present disclosure, fuel injection pressure can be varied to provide operational advantages as the engine operating conditions change.

To this end, electronic control unit 54 may be further structured to vary an injection pressure of the liquid fuel based on the data indicative of transitioning of the engine between the first and second combinations of speed, load, and boost, such that the first charge of liquid fuel is targeted within the corresponding cylinder 14 based on a first injection pressure in the first engine cycle and the second charge of liquid fuel is targeted within the corresponding cylinder 14 based on a second injection pressure in the second engine cycle. Injection of the first charge of liquid fuel can occur using nozzle outlets 66 in fuel injector 56. Based on the orientation of nozzle outlets 66, spray jets of the first charge of liquid fuel have orientations that are based at least in part on a first spray angle of nozzle outlets 66, in the illustrated case, spray angle 116. In typical four-cycle diesel operation, the first charge of liquid fuel is autoignited in the first engine cycle. The first charge of liquid fuel can further include a main charge of liquid fuel producing an output of the engine sufficient to accommodate 100% of a present load demand.

The second charge of liquid fuel can be injected using nozzle outlets 64 in fuel injector 56. Spray jets of the second charge of liquid fuel may have orientations that are based, at least in part, on a second spray angle of nozzle outlets 64 that is different from the first spray angle. In the illustrated case the second spray angle is shown as spray angle 114 in FIG. 2. The second charge of liquid fuel may be autoignited in the second engine cycle. Operation of engine 10 can also include delivering a main charge of gaseous fuel into the corresponding cylinder 14 in the second engine cycle. The second charge of liquid fuel can include a pilot charge of liquid fuel, with the main charge of gaseous fuel providing the energy for accommodating substantially all of the present load demand of engine 10. Autoigniting the second or pilot charge of liquid fuel in the second engine cycle pilot ignites the main charge of gaseous fuel in the second engine cycle in a generally known manner. Using fuel injector 56 as described herein, the first charge of liquid fuel and the second charge of liquid fuel can be supplied to nozzle outlets 66 and nozzle outlets 64, respectively, from common nozzle supply cavity 90.

Certain earlier designs proposed the use of both main liquid fuel injections for a so-called diesel-only mode and pilot liquid fuel injections for a mixed or blended ("dual fuel") mode using the same set of nozzle outlets in a fuel injector. Limitations of this approach arise from compromises that may need to be made between optimizing nozzle outlets, outlet checks, and potentially other parameters for main injection versus optimization of such factors for pilot injection. As a result, many dual fuel engines employing such multifunctional liquid fuel injectors are designed for the rated conditions (typically full load) of the engine. In other words, optimization typically focuses on the use of the fuel injector for main injections in 100% diesel-only mode, potentially to the detriment of functionality for pilot injections in dual fuel mode. The present disclosure is substantially free of such conflicting objectives for the combustion recipes in the different modes, including injector configuration, and enables optimization for both diesel-only operation and dual fuel operation.

Figure 7:
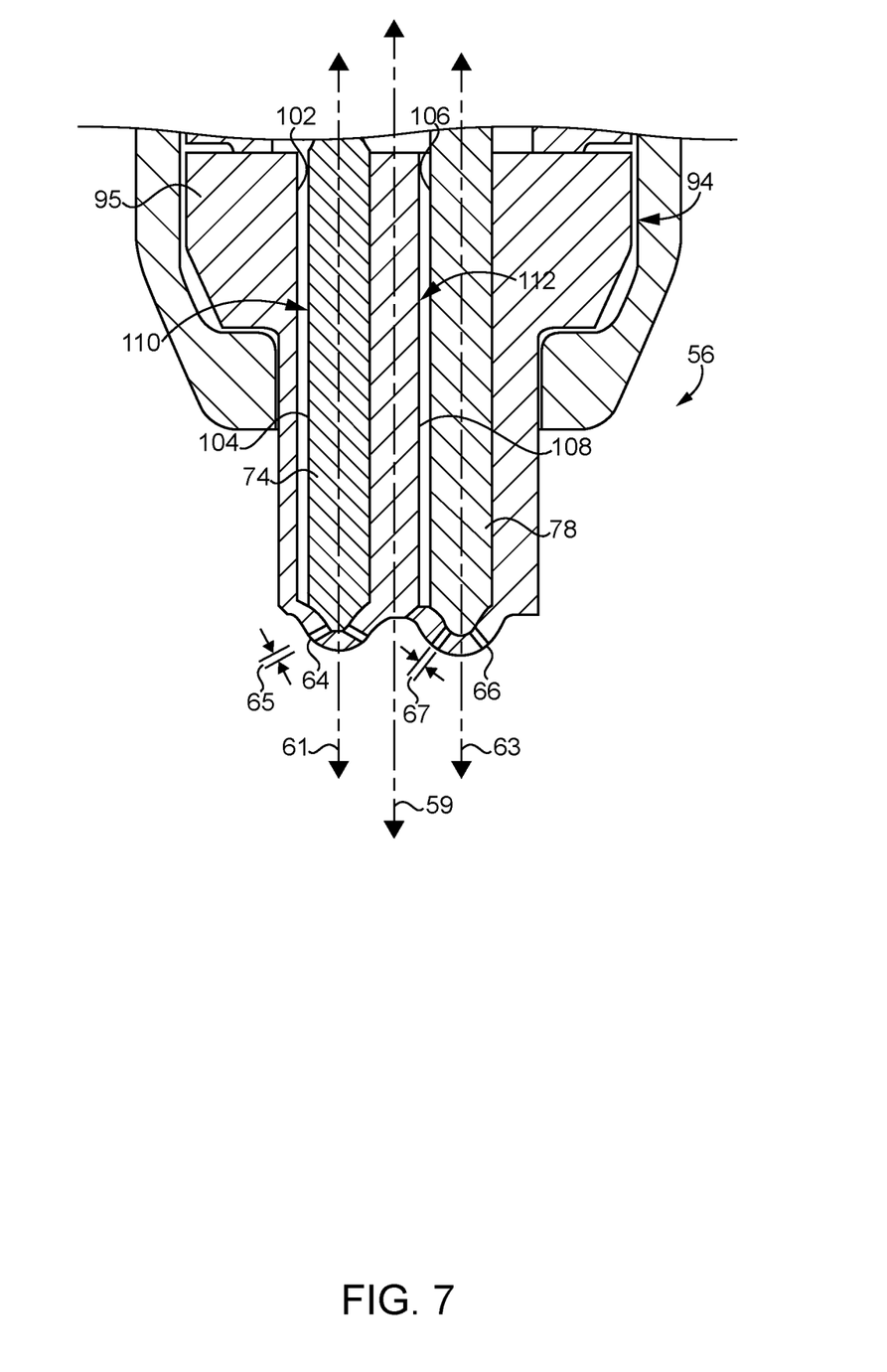
FIG. 7 is an enlarged sectioned view of a portion of a liquid fuel injector, according to one embodiment.

Referring also now to FIG. 7, there is shown a close-up view of a portion of fuel injector 56, illustrating side-by-side arrangement of outlet check 74 and outlet check 78 which are shown in closed positions and structured to lift and return along a first check axis 61 and 75 and a second check axis 63 and 77, respectively, with axes 61 and 63 being parallel to one another and parallel to a longitudinal axis 59 of fuel injector 56 itself. Nozzle outlets 64 may be structured and optimized for pilot injection, whereas nozzle outlets 66 may be structured and optimized for main injection. In one example configuration, nozzle outlets 66 are straight and substantially cylindrical and are from 6 to 8 in number, in one practical implementation 7 in number, and have a hole diameter 67 that is about 300 microns or 0.003 millimeters. Nozzle outlets 66 may be arranged circumferentially about axis 63, have uniform orientations at the subject spray angle and may be evenly spaced from one another. Nozzle outlets 64 might also be straight and substantially cylindrical and be from 3 to 6 in number, in one practical implementation 5 in number, and have a hole diameter 65 that is about 100 microns or 0.001 millimeters. Nozzle outlets 64 may be circumferentially and uniformly spaced about axis 61, and have uniform orientations at the subject spray angle. Also in a practical implementation, spray angle 116 formed by nozzle outlets 66 might be about 130°, and spray angle 114 formed by nozzle outlets 64 might be about 145°. Spray angle 116 could be from about 130° to about 140°, and spray angle 114 could be from about 140° to about 150°. For certain operating schemes, such as where early pilot injections are employed, different nozzle outlet configurations and/or spray angles can be employed, as discussed below.

Figure 8:
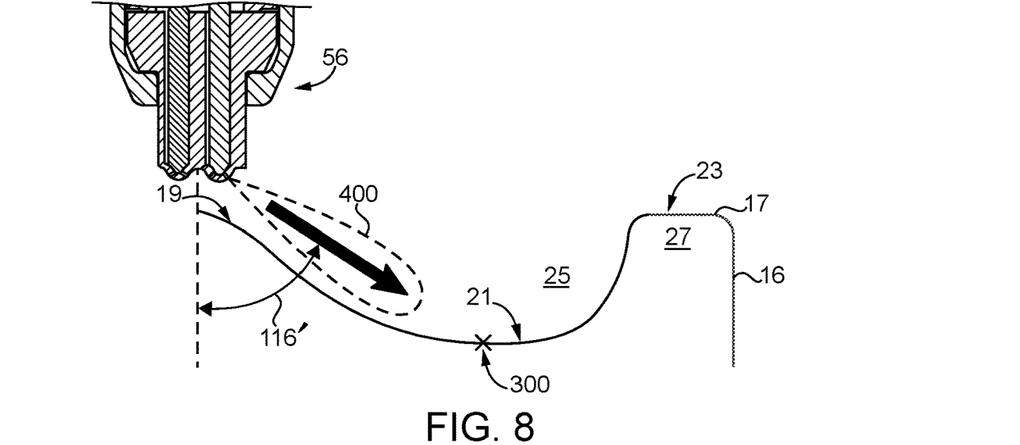
FIG. 8 is a diagrammatic view of liquid fuel injection, and associated apparatus at a first set of conditions.

As noted above, for liquid or diesel-only mode the respective nozzle outlets can be configured for a rated or full-load diesel operation condition. Referring also now to FIG. 8, in diesel-only operation, spray jets of liquid fuel, in the context of the present description the first charge of liquid fuel, may be targeted along a surface of a combustion bowl 25 in a piston 16 within the corresponding cylinder 14. In FIG. 8 piston 16 is shown, illustrating a piston top surface 17 that has a middle or inner convex section 19, an outer rim section 23 that forms a piston rim 27, and a concave bowl section 21 extending between section 19 and section 17 and forming a combustion bowl 25. A fuel spray jet is shown at 400 with an arrow indicating an approximate direction of targeting of fuel spray jet 400 toward a target 300 approximately in the middle or close to the lowest point of combustion bowl 25. Different combustion strategies and objectives might have substantially different targets, which could be consistent for a given engine or class of engines, or change depending upon a presently desired or required outcome. It will be understood that piston 16 is reciprocating up and down within the corresponding cylinder 14, such that a position of piston 16 relative to spray jet 400 can vary with varying engine speed or varying velocity of spray jet 400 as it advances through cylinder 14. A velocity of spray jet 400 can depend upon injection pressure, including injection pressure relative to an internal pressure and/or density of fluid within cylinder 14. Thus, a density of fluids within cylinder 14, including air and potentially gaseous fuel and/or recirculated exhaust gas, can affect the speed and extent of penetration of spray jets of injected liquid fuel. It will therefore be appreciated that changing turbocharger boost pressure, changing engine speed, and changing injection amount can all bear upon the manner in which fuel spray jets advance through an engine cylinder. To obtain desired combustion results, engineers typically target certain features within an engine cylinder as noted above. In the illustration of FIG. 8, spray jet 400 is targeted along surface 17, in particular along the portions of surface 17 forming combustion bowl 25 toward target 300. It has been observed that for at least full-load operation it can be desirable to limit entrainment of air into a fuel spray jet to obtain a desired balance between production of oxides of nitrogen, or NOx, and soot. Spray angle 116', shown relative to a cylinder 14 centerline, may be about 65°.

Figure 9:
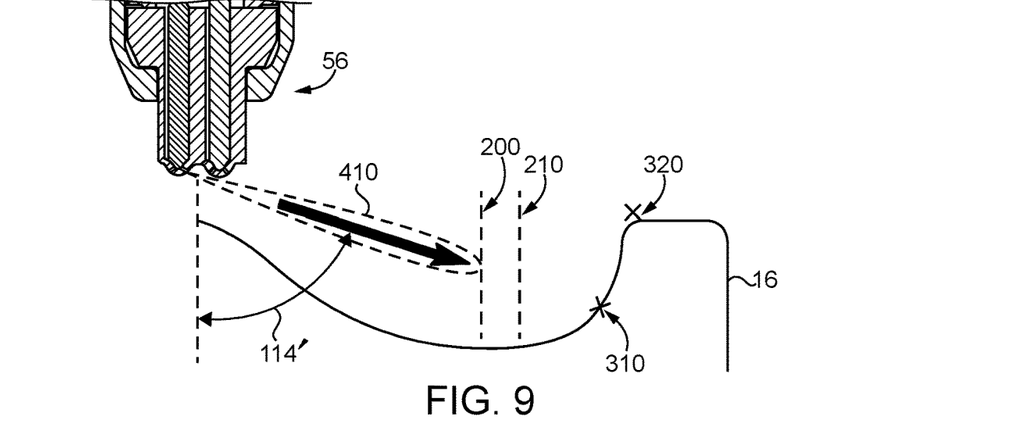
FIG. 9 is a diagrammatic view of liquid fuel injection, and associated apparatus at another set of conditions.

Referring also to FIG. 9, there is shown fuel injector 56 positioned in proximity to piston 16, with a fuel spray jet 410 shown directed from nozzle outlets 64 toward a different target 310. A spray angle 114' relative to the cylinder 14 centerline may be about 72.5°. Reference numeral 200 identifies an approximate location of a tip of spray jet 410, whereas reference numeral 210 identifies an approximate location of a tip of spray jet 410 that might be observed under other conditions. It will be recalled that controlling injection pressure can enable targeting of a first charge of liquid fuel and a second fuel charge within cylinder 14 based upon a first injection pressure in a first engine cycle and a second injection pressure in a second engine cycle, respectively. It is also contemplated that varying injection pressure in the manner described herein enables limiting errors in targeting of the second charge of liquid fuel that are caused by transitioning of engine 10 as described herein. Since changes in turbocharger boost pressure, injection amount and/or duration to accommodate different engine loads, and changes in engine speed can all affect the manner in which a spray jet advances through a cylinder, varying injection pressure can be employed to limit errors in targeting that might otherwise occur.

For example, in the FIG. 9 illustration it can be assumed that spray jet 410 has advanced to location 200 at a given engine timing or crank angle, with a first combination of speed, load, and boost, but might have instead advanced to location 210 at the same engine timing with a different combination of speed, load, and boost. As a result, the changed conditions from one engine cycle to another engine cycle could cause spray jet 410 to hit piston 16 at a different and unintended target 320 than the intended target 310, disrupting the desired combustion characteristics. For instance, instead of hitting the outer part of combustion bowl 25, improper targeting might cause spray jet 410 to hit the rim 27 of combustion bowl 25, spray the cylinder 14 liner, or otherwise follow an undesired path and/or hit a different target than the target intended. Of course in other instances, the rim 27 location 320 could be the desired target and the undesired target be at 310.

It should thus be further appreciated that other piston design features could be intended to interact with injected fuel in a manner different from that depicted herein. For instance, while spray jet 400 shown in FIG. 8 is targeted along a surface of combustion bowl 25, and spray jet 410 is targeted above surface 17 of combustion bowl 25, in other examples different spray patterns and targets might be employed. Moreover, another factor impacting when or how a spray jet will contact a certain location on a piston bowl includes start of injection timing, and also potentially end of injection timing. The present disclosure provides for injection pressure scheduling based on certain operating parameters to target particular types or patterns of bowl interaction across different operating points. Injection pressure scheduling can thus be exploited to improve consistency or accuracy in hitting a certain target, or to enable hitting different targets from one cycle to another. Where boost is being varied, increasing or decreasing injection pressure can increase or decrease spray jet penetration. In other words, where turbocharger boost varies from one engine cycle to another, varying injection pressure can compensate for a change to a density of fluid within cylinder 14 that is induced by the transitioning of the engine as described herein. Limiting of errors in targeting can also include varying injection pressure so as to compensate for a change to a speed of reciprocation of piston 16 that is induced by the transitioning of engine 10. Decreasing injection pressure can result in decreased fuel jet penetration, and increased injection pressure can result in increased fuel jet penetration as discussed herein, however, increasing or decreasing injection pressure can also result in maintaining fuel jet penetration where other factors are also changing. For example, an increased boost pressure could be expected to limit fuel spray jet penetration, such that increasing injection pressure could compensate for the increased boost pressure and maintain the same fuel jet penetration with other factors being equal. Other combinations, variations, and extensions upon these basic principles will be envisioned by those skilled in the art.

Figure 10:
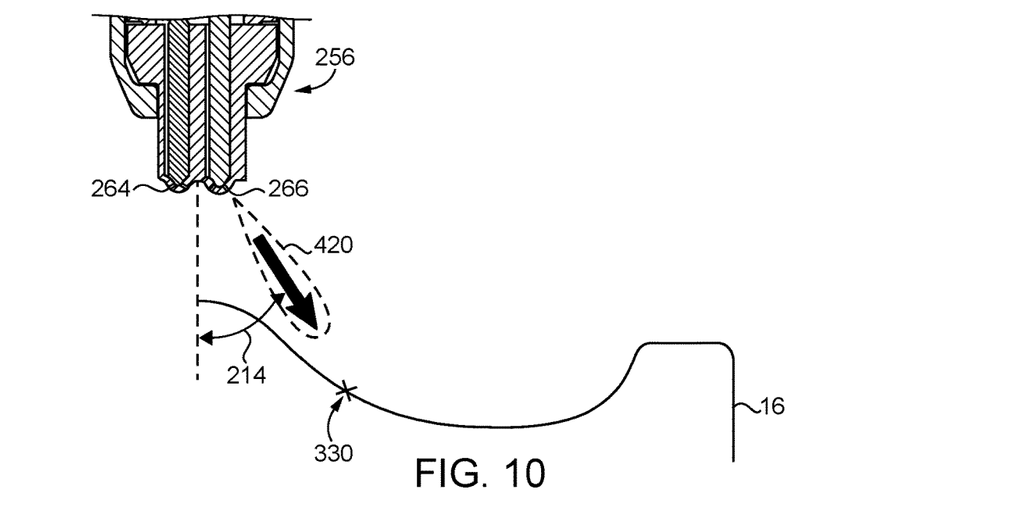
FIG. 10 is a diagrammatic view of liquid fuel injection and associated apparatus using a different liquid fuel injector.

Referring to FIG. 10, there is shown another fuel injector 256 similar or identical in most respects to the other fuel injectors discussed and contemplated herein, but configured for early pilot injection (either as early pilots in diesel only mode or potentially in a dual fuel mode or still another mode), such that a set of nozzle outlets 266 might be structured substantially identically to nozzle outlets 66 in fuel injector 56, but where another set of nozzle outlets 264 are structured to have a spray angle 214 that might be narrower than a counterpart spray angle (not labeled) formed by nozzle outlets 266. Spray angle 214 might be from about 60° to about 65°, with nozzle outlets 264 being 5 in number, and having a hole diameter 65,67 of about 100 microns or 0.001 millimeters. An additional objective where early pilot injections are used can be to keep liquid diesel fuel away from the liner given that in early pilot conditions the piston 16 can be in a much lower position at the start of injection as compared with standard injections. Spray jet 420 is shown directed toward a target 330.

INDUSTRIAL APPLICABILITY

Referring to the drawings generally, it will be recalled that engine system 8 can be operated in multiple different modes. During a diesel-only mode outlet check 78 can be operated by way of injection control valve assembly 84 to open and close to inject a main charge of diesel fuel in an engine cycle. Embodiments are also contemplated wherein both of outlet check 78 and outlet check 74 are operated by way of control valve assembly 84 and control valve assembly 81, respectively, to cooperate in injection of a main charge of diesel fuel, provide successive injections within the same engine cycle, such as pilot injections, pre-injections, or post-injections or perform other variations. In a typical diesel-only mode, injection control valve assembly 84 can be energized to lift injection control valve 85 from its seat to cause a drop in pressure in control chamber 70, in turn enabling pressure acting on opening hydraulic surfaces of outlet check 78 in common nozzle supply cavity 90 to lift outlet check 78 to open nozzle outlets 66. When injection is to be ended, or just prior to when injection is to be ended, injection control valve assembly 84 is de-energized, to close injection control valve 85 and enable pressure to increase in control chamber 70 and act upon closing hydraulic surface 80 to cause outlet check 78 to close. Piston 16 moves in a conventional four-phase cycle to intake, compress, combust, and exhaust the mixture of air and diesel fuel.

Operation in a dual fuel mode, where liquid fuel is used for pilot ignition, occurs in a generally analogous manner, with injection control valve assembly 81 being energized and de-energized to vary pressure within control chamber 68 and cause outlet check 74 to adjust between its open and closed positions. Rather than a main charge of injected liquid fuel compression igniting, in a dual fuel mode the relatively small pilot charge will be compression ignited, whereupon the combustion flame of the pilot charge can ignite the main charge of gaseous fuel delivered into the corresponding combustion cylinder 14. As noted above, employing twin outlet checks can enable separation of design of each outlet check for different purposes, namely, injection of a main charge versus injection of a pilot charge. It will also be recalled that certain parameters of injection and/or design of the respective outlet checks can differ to obtain different injection amounts and different injection properties. A pilot charge may be injected at a relatively shallower angle except potentially in the case of an injector configured for early pilots as discussed herein, whereas a main charge can be injected at a somewhat deeper angle. It will also be recalled that orifice sets 86 and 88 affect the nature of fuel injection, and can be sized to various ends. F-orifices can be employed to slow a rate of pressure drop in the control chambers when connected to low pressure, and can hasten the rate of pressure build at the end of injection. As a result, the F-orifices can assist in obtaining a relatively square rate shape to an end of injection, or tailored to obtain another rate shape. Z-orifices can analogously assist in obtaining a relatively square end of injection rate shape, for example. Varying a size of a Z-orifice within the present context tends to have a relatively larger effect on end-of-injection properties than varying the size of an F-orifice. The M-orifices are controlled clearances around the outlet checks that act to retard the start of injection. The A-orifices also tend to affect start of injection, assisting in controlling spilling of pressure from the associated control chamber.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel system for an engine comprising:
a pressurized fuel reservoir;
a fuel pressure control device structured to vary a fuel pressure in the pressurized fuel reservoir;
a liquid fuel injector defining a first set of nozzle outlets, and a second set of nozzle outlets, and including a first outlet check movable to open or close the first set of nozzle outlets to the pressurized fuel reservoir, and a second outlet check movable to open or close the second set of nozzle outlets to the pressurized fuel reservoir;
the liquid fuel injector further including a first injection control valve and a second injection control valve coupled with the first outlet check and the second outlet check, respectively;
a control system including an electronic control unit coupled with each of the first injection control valve and the second injection control valve and with the fuel pressure control device, the electronic control unit being structured to:
command actuation of the first injection control valve to inject a first charge of liquid fuel into a cylinder in the engine using the first set of nozzle outlets;
command actuation of the second injection control valve to inject a second charge of liquid fuel into the cylinder in the engine using the second set of nozzle outlets;
receive data indicative of transitioning of the engine between a first combination of speed, load, and boost in a first engine cycle, and a second combination of speed, load, and boost in a second engine cycle; and
vary an injection pressure of the liquid fuel based on the data indicative of transitioning of the engine, such that the first charge of liquid fuel is targeted within the cylinder based on a first injection pressure in the first engine cycle and the second charge of liquid fuel is targeted within the cylinder based on a second injection pressure in the second engine cycle.

2. The fuel system of claim 1 wherein the pressurized fuel reservoir includes a common rail coupled with the liquid fuel injector and with at least one additional liquid fuel injector.

3. The fuel system of claim 1 further comprising a gaseous fuel admission valve structured to deliver gaseous fuel into the cylinder in the engine.

4. The fuel system of claim 3 wherein the fuel injector further includes a common nozzle supply cavity for each of the first set of nozzle outlets and the second set of nozzle outlets.

5. The fuel system of claim 3 wherein:
the first outlet check includes a pilot injection check, and the second outlet check includes a main injection check arranged side-by-side with the pilot injection check; and
the first set of nozzle outlets has at least one of a spray angle, an outlet size, or an outlet number that is different from a spray angle, an outlet size or an outlet number of the second set of nozzle outlets.

6. The fuel system of claim 1 wherein the liquid fuel injector further includes an orifice plate, the orifice plate including:
a one-piece orifice plate body having a first inlet passage and a second inlet passage for feeding high pressure fuel to first and second control chambers for the first outlet check and the second outlet check, respectively, and a first outlet passage and a second outlet passage for connecting the first and second control chambers, respectively, to a low pressure space.

7. The fuel system of claim 6 wherein the orifice plate further includes:
a first set of orifices in the orifice plate body including a first A-orifice formed in the first outlet passage, a first Z-orifice formed in the first inlet passage, and a first F-orifice;

a second set of orifices in the orifice plate body including
   a second A-orifice formed in the second outlet passage,
   a second Z-orifice formed in the second inlet passage,
   and a second F-orifice; and
the first and the second F-orifices fluidly connecting the first and the second outlet passages, respectively, to the common nozzle supply cavity.

8. A fuel system for an engine comprising:
   a gaseous fuel admission valve structured to deliver a gaseous fuel from a gaseous fuel supply into a cylinder in the engine;
   a liquid fuel injector defining a first set of nozzle outlets, and a second set of nozzle outlets, and including a first outlet check movable to open or close the first set of nozzle outlets, and a second outlet check movable to open or close the second set of nozzle outlets;
   the liquid fuel injector further including a first injection control valve and a second injection control valve coupled with the first outlet check and the second outlet check, respectively;
   a control system including an electronic control unit structured to:
      command actuation of the first injection control valve to inject a pilot charge of liquid fuel into a cylinder in the engine using the first set of nozzle outlets to ignite a main charge of the gaseous fuel in a first engine cycle;
      command actuation of the second injection control valve to inject a main charge of liquid fuel into the cylinder in the engine using the second set of nozzle outlets in a second engine cycle; and
      vary an injection pressure of the liquid fuel from the first engine cycle to the second engine cycle, such the pilot charge of liquid fuel is targeted within the cylinder based on a first injection pressure and the main charge of liquid fuel is targeted within the cylinder based on a second injection pressure.

9. The fuel system of claim 8 further comprising a pressurized fuel reservoir of the liquid fuel structured to supply the liquid fuel to the fuel injector at the first injection pressure and at the second injection pressure.

10. The fuel system of claim 9 wherein the electronic control unit is further structured to schedule the first injection pressure and the second injection pressure, and to vary the injection pressure of the liquid fuel from the first engine cycle to the second engine cycle based on the scheduled first injection pressure and second injection pressure.

11. The fuel system of claim 8 wherein the first set of nozzle outlets has at least one of a spray angle, an outlet size, or an outlet number that is different from a spray angle, an outlet size or an outlet number of the second set of nozzle outlets.

12. The fuel system of claim 11 wherein a spray angle of the first set of nozzle outlets is larger than a spray angle of the second set of nozzle outlets.

13. The fuel system of claim 12 wherein the first outlet check and the second outlet check are arranged side-by-side.

14. The fuel system of claim 8 wherein the liquid fuel injector has formed therein a high pressure inlet passage, a common nozzle supply cavity fluidly connected to the high pressure inlet passage, a first nozzle supply passage fluidly connecting the common nozzle supply cavity to the first set of nozzle outlets, and a second nozzle supply passage fluidly connecting the common nozzle supply cavity to the second set of nozzle outlets.

15. The fuel system of claim 14 wherein the first outlet check includes a closing hydraulic surface exposed to a first control chamber in the liquid fuel injector, and the second outlet check includes a closing hydraulic surface exposed to a second control chamber in the liquid fuel injector.

16. The fuel system of claim 15 wherein the liquid fuel injector defines a low pressure space, and further includes an orifice plate having formed therein a first set of orifices and a second set of orifices each arranged in an A-F-Z pattern among the common nozzle supply cavity, the low pressure space and, respectively, the first control chamber and the second control chamber.

17. A liquid fuel injector comprising:
   an injector body defining a longitudinal axis and having formed therein a high pressure inlet;
   a tip piece having formed therein a first set of nozzle outlets and a second set of nozzle outlets;
   a first outlet check having a closing hydraulic surface and being movable to open or close the first set of nozzle outlets;
   a second outlet check side-by-side with the first outlet check and having a closing hydraulic surface and being movable to open or close the second set of nozzle outlets;
   an orifice plate arranged axially between the tip piece and the injector body;
   a first control chamber formed between the closing hydraulic surface of the first outlet check and the orifice plate;
   a second control chamber formed between the closing hydraulic surface of the second outlet check and the orifice plate;
   the liquid fuel injector defining a low pressure space, and the orifice plate having formed therein a first set of orifices and a second set of orifices each having an A-orifice fluidly between the low pressure space and one of the first control chamber or the second control chamber, a Z-orifice fluidly between the high pressure inlet and the respective one of the first control chamber or the second control chamber, and an F-orifice; and
   wherein the orifice plate further has formed therein a raised sealing surface, and a connector channel formed in the raised sealing surface and fluidly connecting the Z-orifice in the first set of orifices to the Z-orifice in the second set of orifices.

18. The liquid fuel injector of claim 17 wherein each F-orifice is positioned to fluidly connect the respective A-orifice to a fuel pressure of the high pressure inlet.

* * * * *